Robert Burns Goodyear
Device to protect the Shuttle Boxes of Looms against breakage.
117533  PATENTED AUG 1 1871
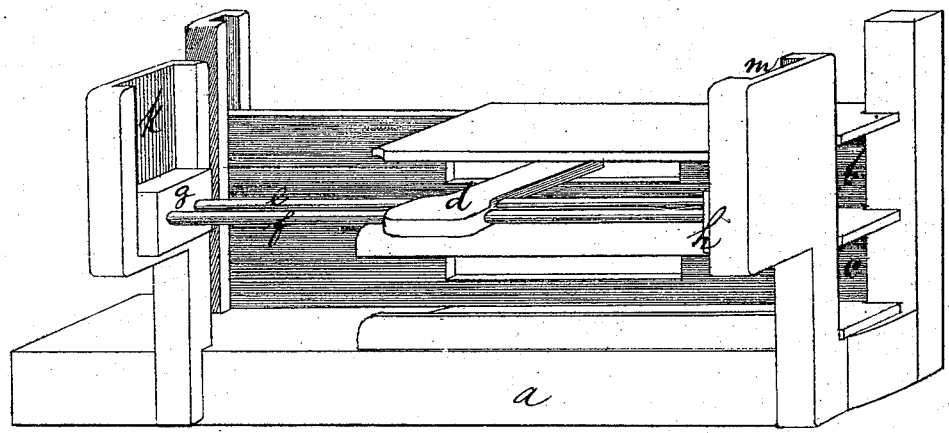
Witnesses.
Wm R. Wright
Chas Parham
Inventor.
Robert B Goodyear

UNITED STATES PATENT OFFICE.

ROBERT BURNS GOODYEAR, OF WILMINGTON, DELAWARE.

IMPROVEMENT IN LOOMS.

Specification forming part of Letters Patent No. 117,533, dated August 1, 1871.

*To all whom it may concern:*

Be it known that I, ROBERT BURNS GOODYEAR, of Wilmington, Delaware, have invented a new and useful Device for Protecting the Shuttle-Boxes of Looms Against Breakage, of which device the following is a specification:

The breakage to be obviated is that which is of common occurrence where a single picker is employed with a series of several shuttle-boxes.

My invention consists in constructing the picker-spindles with free bearings, or with a certain free motion in their bearings, so that they can move with the shuttle-boxes when the picker (from the breaking of the pulling-back spring, strap, or other device by which the picker is attached in the ordinary manner to the loom-frame) remains accidentally in any of the boxes and thus presents an unyielding obstacle to the motion of the boxes and occasions the breakage referred to.

The drawing represents a perspective view of that portion of a loom-frame which supports the shuttle-boxes—the boxes two in number—the picker and its spindles, the spindle-bearings, and the grooves in which these bearings slide.

*a* is the loom-frame; *b* and *c*, the shuttle-boxes; *d*, the picker; *e* and *f*, the picker-spindles, which have bearings in the blocks *g* and *h*, which latter slide in the grooves *k* and *m*. The picker *d* is designed to be attached to the frame as usual by a spring or strap (not shown) to draw it back out of the way of the boxes as they move. In case the drawing-back attachment of the picker *d* breaks, and the picker is left, as represented, in the way of the boxes, the latter moving tend to move the picker and its spindles *e* and *f*, which, being attached to the movable bearings *g* and *h*, move along with the boxes which are thus protected against breakage. Instead of employing the movable bearing-blocks *g* and *h*, stationary blocks or bearings, with slots in them for the ends of the picker-spindles *e* and *f* to move, in may be employed with equal advantage.

I claim—

The shuttle-boxes, when constructed in a series of two or more, in combination with the single picker *d* and the picker-spindles *e* and *f*, which have a free motion in their bearings, all to prevent breakage of the shuttle-boxes when the picker is left accidentally in their way, substantially as set forth.

ROBERT B. GOODYEAR.

Witnesses:
 WM. R. WRIGHT,
 CHAS. PARHAM.